United States Patent
Wilson et al.

(10) Patent No.: US 10,801,348 B2
(45) Date of Patent: Oct. 13, 2020

(54) NON-CONTACTING DYNAMIC SEAL

(71) Applicant: United Technologies Corporation, Hartford, CT (US)

(72) Inventors: Ross Wilson, South Glastonbury, CT (US); John R. Farris, Bolton, CT (US); Michael G. McCaffrey, Windsor, CT (US); Theodore W. Hall, Berlin, CT (US); John J. Korzendorfer, Glastonbury, CT (US); Elizabeth F. Vinson, Wethersfield, CT (US); Jeffrey Michael Jacques, East Hartford, CT (US); John E. Paul, Portland, CT (US); Edwin Otero, Southington, CT (US); Alan W. Stoner, Tullahoma, TN (US)

(73) Assignee: Raytheon Technologies Corporation, Farmington, CT (US)

( * ) Notice: Subject to any disclaimer, the term of this patent is extended or adjusted under 35 U.S.C. 154(b) by 1013 days.

(21) Appl. No.: 14/852,838

(22) Filed: Sep. 14, 2015

(65) Prior Publication Data

US 2016/0102570 A1     Apr. 14, 2016

Related U.S. Application Data

(60) Provisional application No. 62/063,705, filed on Oct. 14, 2014.

(51) Int. Cl.
| | |
|---|---|
| *F16J 15/44* | (2006.01) |
| *F01D 11/02* | (2006.01) |
| *F16F 15/06* | (2006.01) |
| *F01D 25/04* | (2006.01) |

(52) U.S. Cl.
CPC ............ *F01D 11/02* (2013.01); *F01D 11/025* (2013.01); *F01D 25/04* (2013.01); *F16F 15/06* (2013.01); *F16J 15/44* (2013.01); *F16J 15/442* (2013.01); *F05D 2220/32* (2013.01); *F05D 2240/55* (2013.01); *F05D 2260/96* (2013.01); *F05D 2300/171* (2013.01)

(58) Field of Classification Search
CPC .... F16J 15/44; F16J 15/447; F16J 1/18; F16J 15/34
See application file for complete search history.

(56) References Cited

U.S. PATENT DOCUMENTS

| | | | | |
|---|---|---|---|---|
| 3,594,010 | A | | 7/1971 | Warth |
| 4,375,292 | A | * | 3/1983 | Ericson ................. F16J 15/348 277/371 |
| 4,405,134 | A | * | 9/1983 | Sargent ................. F16J 15/441 277/422 |

(Continued)

OTHER PUBLICATIONS

Extended European Search Report dated Mar. 9, 2016 in European Application No. 15188778.3.

*Primary Examiner* — Vishal A Patel
(74) *Attorney, Agent, or Firm* — Snell & Wilmer L.L.P.

(57) ABSTRACT

Non-contacting dynamic seals having wave springs are disclosed herein. A non-contacting dynamic seal may have a shoe coupled to an outer ring by an inner beam and an outer beam. A wave spring may be located between the inner beam and the outer beam, between the shoe and the inner beam, or between the outer beam and the outer ring. The wave spring may damp vibrations in the inner beam and the outer beam.

3 Claims, 6 Drawing Sheets

(56) References Cited

U.S. PATENT DOCUMENTS

| | | | | |
|---|---|---|---|---|
| 4,426,087 A * | 1/1984 | Sargent | | F16J 15/441 277/422 |
| 4,676,715 A * | 6/1987 | Imbault | | F01D 25/246 415/116 |
| 4,795,274 A * | 1/1989 | Gu | | F16C 17/024 384/106 |
| 5,322,371 A * | 6/1994 | Signoret | | F16C 17/024 384/106 |
| 5,407,321 A * | 4/1995 | Rimkunas | | F01D 5/16 415/115 |
| 6,311,983 B1 * | 11/2001 | Burcham | | F16J 15/002 277/370 |
| 7,182,345 B2 * | 2/2007 | Justak | | F01D 11/00 277/355 |
| 7,410,173 B2 * | 8/2008 | Justak | | F01D 11/00 277/355 |
| 7,896,352 B2 * | 3/2011 | Justak | | F16J 15/442 277/411 |
| 8,002,285 B2 * | 8/2011 | Justak | | F01D 11/02 277/412 |
| 8,919,781 B2 * | 12/2014 | Justak | | F01D 11/025 277/411 |
| 2006/0097457 A1 * | 5/2006 | Flaherty | | F16J 15/3272 277/543 |
| 2007/0120327 A1 | 5/2007 | Justak | | |
| 2008/0100000 A1 * | 5/2008 | Justak | | F16J 15/442 277/355 |
| 2008/0197575 A1 * | 8/2008 | El-Aini | | F01D 11/02 277/303 |
| 2008/0246223 A1 * | 10/2008 | Justak | | F01D 11/02 277/411 |
| 2008/0309019 A1 * | 12/2008 | Wolfe | | F01D 11/003 277/420 |
| 2012/0049461 A1 * | 3/2012 | Deo | | F01D 11/02 277/303 |
| 2012/0308368 A1 * | 12/2012 | Helvaci | | F01D 11/00 415/175 |
| 2013/0234399 A1 | 9/2013 | Justak | | |
| 2014/0119912 A1 | 5/2014 | Bidkar et al. | | |
| 2015/0322816 A1 * | 11/2015 | Schmitz | | F01D 1/04 60/796 |
| 2016/0069269 A1 * | 3/2016 | Hyland | | F01D 19/00 415/1 |

* cited by examiner

NON-CONTACTING DYNAMIC SEAL

CROSS-REFERENCE TO RELATED APPLICATIONS

This application is a nonprovisional of, and claims priority to, and the benefit of U.S. Provisional Application No. 62/063,705, entitled "NON-CONTACTING DYNAMIC SEAL," filed on Oct. 14, 2014, which is hereby incorporated by reference in its entirety.

FIELD

The disclosure relates generally to gas turbine engines, and more particularly to seals in gas turbine engines.

BACKGROUND

Gas turbine engines typically comprise seals located around rotating components. The seals may prevent movement of fluid, such as air, between locations on opposite sides of the seal. One type of seal used in gas turbine engines is a conventional non-contacting dynamic seal, such as a HALO seal manufactured by Advanced Technologies Group, Inc. The non-contacting dynamic seals may decrease the amount of leakage across the seal. Additionally, the non-contacting dynamic seals may be sensitive to engine vibrations and require damping.

SUMMARY

A non-contacting dynamic seal may comprise a full hoop outer ring, a shoe, and a wave spring. The shoe may be coupled to the full hoop outer ring via an inner beam and an outer beam. The wave spring may be in contact with at least one of the inner beam or the outer beam.

In various embodiments, the wave spring may be located between the inner beam and the outer beam. The wave spring may be located between the shoe and the inner beam. The wave spring may be located between the outer beam and the full hoop outer ring. The wave spring may comprise at least three antinodes. The antinodes may be configured to slide against at least one of the inner beam or the outer beam in response to a vibration in the non-contacting dynamic seal. The wave spring may comprise at least one of a cobalt alloy or a nickel alloy. The non-contacting dynamic seal may comprise a plurality of inner segments, wherein each inner segment comprises a respective wave spring.

A seal assembly for a gas turbine engine may comprise an outer ring, a shoe, a first beam and a second beam, and a first wave spring. The shoe may be coupled to the outer ring. The shoe may be configured to move radially with respect to the outer ring. The first beam and the second beam may couple the shoe to the outer ring. The first wave spring may be located between the first beam and the second beam. The first wave spring may be configured to damp vibrations in the first beam and the second beam.

In various embodiments, the seal assembly may be a non-contacting dynamic seal. The first wave spring may comprise a first antinode and a second antinode in contact with the first beam, and a third antinode in contact with the second beam. The first antinode and the second antinode may be configured to slide against the first beam in response to a vibration in the first beam. A second wave spring may be between the first beam and the second beam. A third wave spring may be between the first beam and at least one of the shoe or the outer ring. The first wave spring may comprise at least one of cobalt alloy and nickel alloy.

A method of damping vibrations in a seal may comprise inserting a first wave spring between a first beam and a second beam of the seal. In various embodiments, the wave spring may comprise a first antinode and a second antinode in contact with the first beam, and a third antinode in contact with the second beam. The wave spring may comprise a first antinode and a second antinode in contact with the first beam, and a third antinode in contact with the second beam. The method may comprise configuring the first antinode and the second antinode to slide against the first beam. The seal may be a non-contacting dynamic seal. The method may comprise inserting a second wave spring between the second beam and a shoe of the seal.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
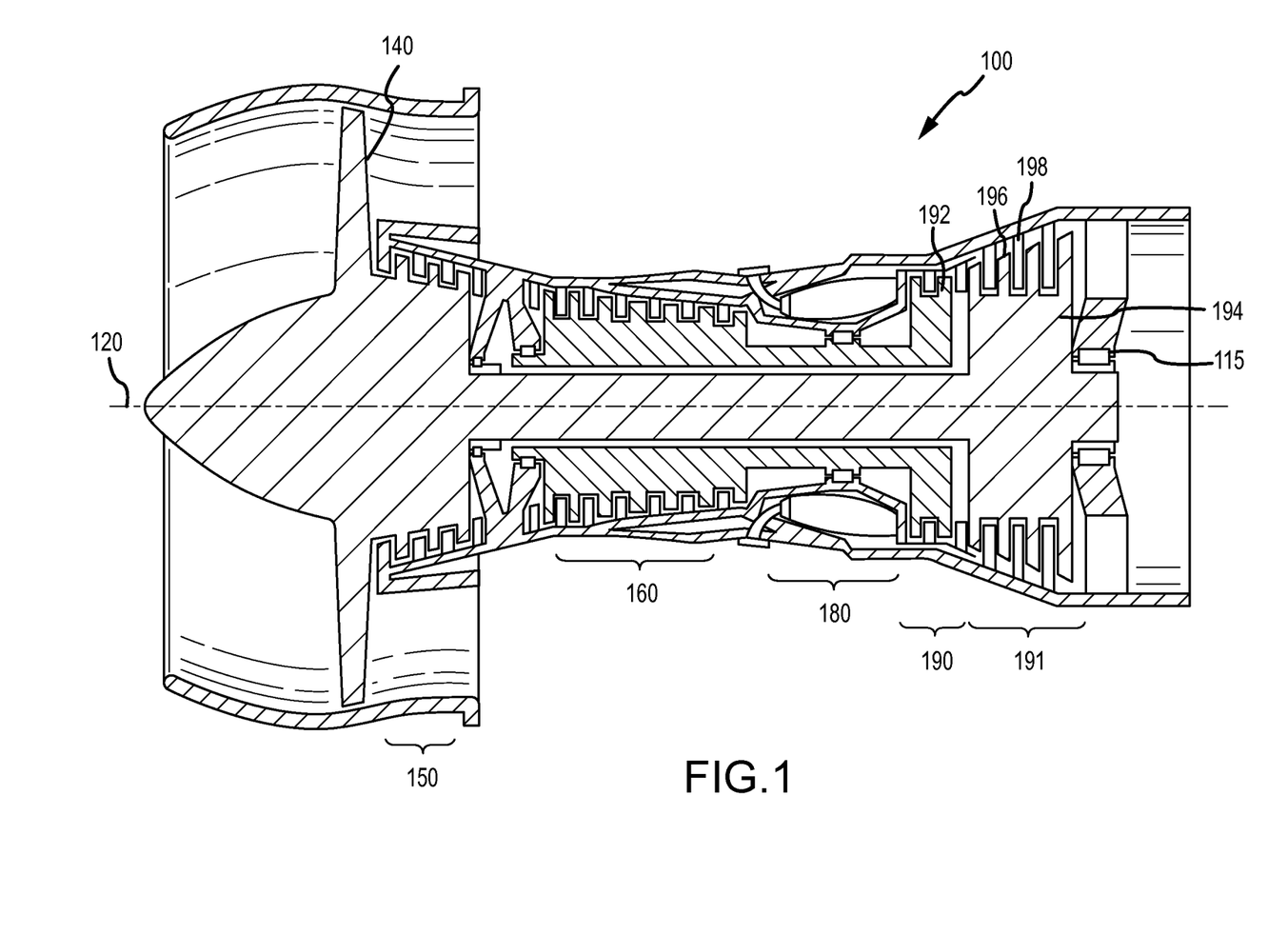
FIG. 1 illustrates a schematic cross-section view of a gas turbine engine in accordance with various embodiments.

Referring to FIG. 1, a gas turbine engine 100 (such as a turbofan gas turbine engine) is illustrated according to various embodiments. Gas turbine engine 100 is disposed about axial centerline axis 120, which may also be referred to as axis of rotation 120. Gas turbine engine 100 may comprise a fan 140, compressor sections 150 and 160, a combustion section 180, and turbine sections 190, 191. Air compressed in the compressor sections 150, 160 may be mixed with fuel and burned in combustion section 180 and expanded across the turbine sections 190, 191. The turbine sections 190, 191 may include high pressure rotors 192 and low pressure rotors 194, which rotate in response to the expansion. The turbine sections 190, 191 may comprise alternating rows of rotary airfoils or blades 196 and static airfoils or vanes 198. Cooling air may be supplied to the turbine sections 190, 191 from the compressor sections 150, 160. A plurality of bearings 115 may support spools in the gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
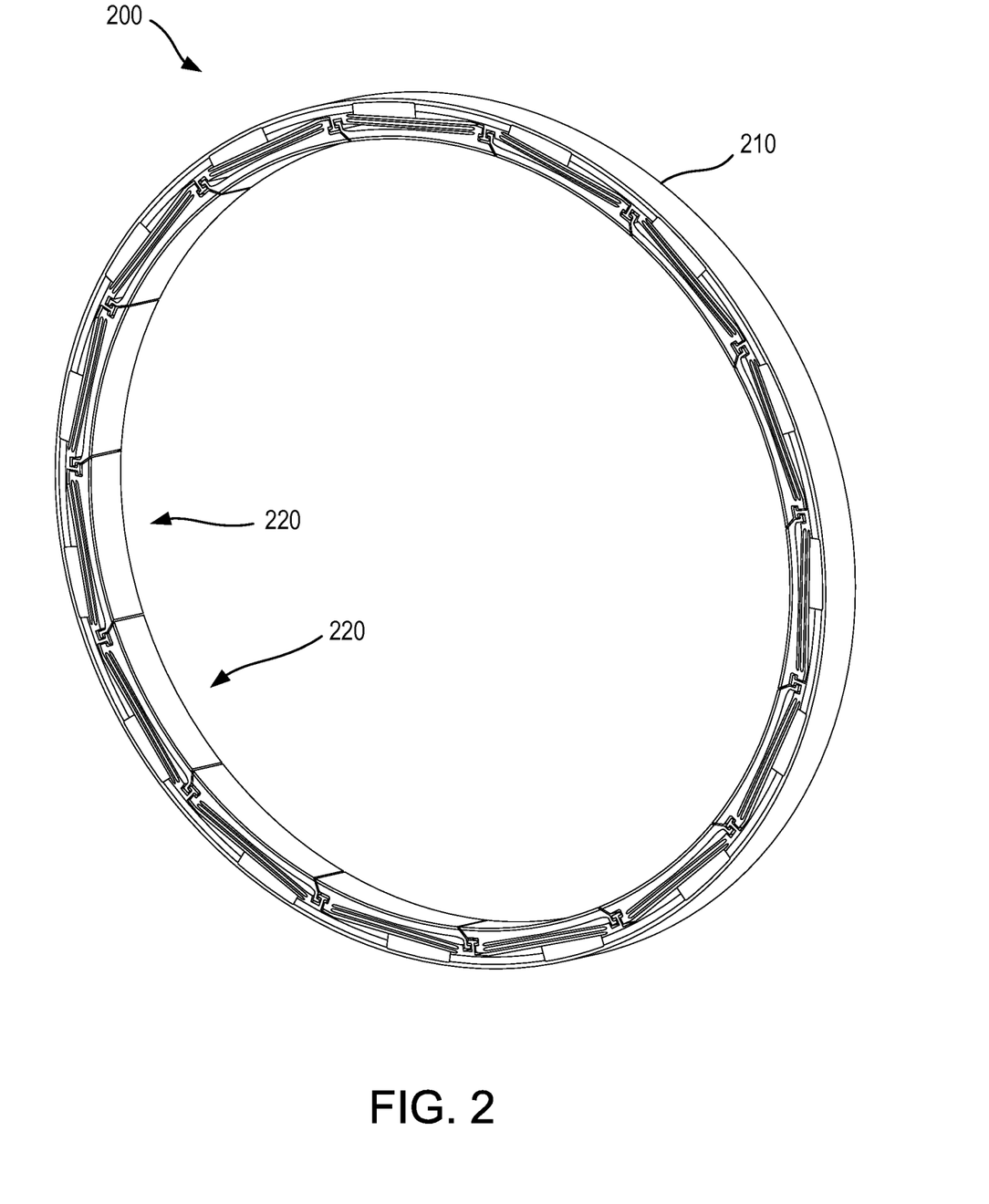
FIG. 2 illustrates a perspective view of a non-contacting dynamic seal in accordance with various embodiments.

Referring to FIG. 2, a perspective view of a non-contacting dynamic seal ("NCDS") 200 is illustrated according to various embodiments. The NCDS 200 may comprise a full hoop outer ring 210 and a plurality of inner segments 220. The NCDS 200 may circumscribe a rotating component, such as a rotor shaft. The NCDS 200 may form a seal around the rotating component without contacting the rotating component. A thin air cushion may be formed between the inner segments 220 and the rotating component which prevents contact between the inner segments 220 and the rotating component. The rotating component may radially expand or contract with changes in temperature, and an increase in air pressure between the rotating component and the inner segments 220 may cause the inner segments 220 to move radially inward or outward in response to the change in size of the rotating component. Each inner segment 220 may comprise a wave spring, as further described with reference to FIGS. 3-5.

Figure 3:
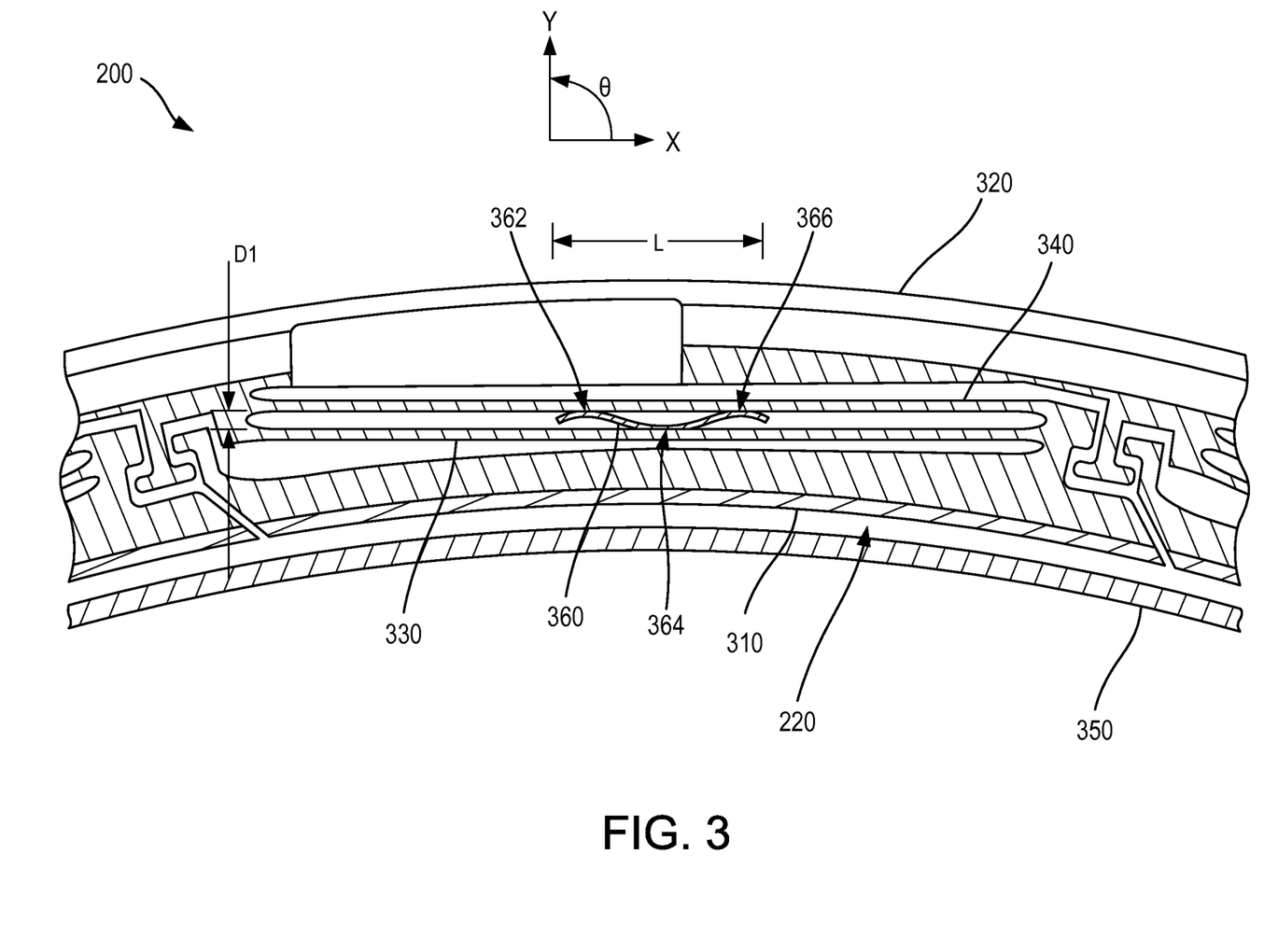
FIG. 3 illustrates a cross-section view in an axial direction of a non-contacting dynamic seal comprising a wave spring in accordance with various embodiments.

Referring to FIG. 3, a cross-section view of an inner segment 220 of NCDS 200 is illustrated according to various embodiments. X-y axes are provided for ease of illustration, with a direction in the negative y direction referred to as radially inward and a direction in the positive y direction referred to as radially outward. The inner segment 300 may comprise a shoe 310 coupled to the outer hoop 320 via an inner beam 330 and an outer beam 340. A thin layer of air may form between the shoe 310 and a rotating component 350. The thin layer of air may prevent contact between the shoe 310 and the rotating component 350. As the rotating component 350 expands or contracts, the shoe 310 may move radially outward or radially inward by a corresponding amount. The inner beam 330 and the outer beam 340 may allow the shoe 310 to move radially inward or outward without tilting in the θ direction.

During testing of the NCDS 200, it was discovered that vibrational waves may exist in the inner beam 330 and the outer beam 340. The vibrational waves may cause fatigue of the inner beam 330 or the outer beam 340. Fatigue of the inner beam 330 or outer beam 340 could result in reduced sealing effectiveness and durability of the NCDS 200.

A wave spring 360 may be inserted in the NCDS 200. In various embodiments, the wave spring 360 may be located between the shoe 310 and the inner beam 330, between the inner beam 330 and the outer beam 340, and/or between the outer beam 340 and the outer hoop 320. Any number of wave springs may be utilized.

Each wave spring may comprise at least three antinodes. For example, wave spring 360 comprises a first antinode 362 in contact with the outer beam 340, a second antinode 364 in contact with the inner beam 330, and a third antinode 366 in contact with the outer beam 340. However, in various embodiments, wave spring 360 may comprise any suitable number of antinodes. In various embodiments, wave spring 360 may comprise at least one of a nickel alloy and/or a cobalt alloy. However, wave spring 360 may comprise any suitable material.

In response to vibration of the inner beam 330 or the outer beam 340, the distance D1 between the inner beam 330 and the outer beam 340 may change. In response to the distance D1 decreasing, the inner beam 330 and the outer beam 340 may compress the wave spring 360. As the wave spring 360 compresses, the length L of the wave spring 360 may increase. The increase in the length L may cause the first antinode 362 to slide against the outer beam 340 in the negative x-direction, and the third antinode 366 to slide against the outer beam 340 in the positive x-direction. The friction from the sliding contact may dissipate energy in the vibrations of the inner beam 330 and/or the outer beam 340. Thus, the wave spring 360 may damp vibrations in the inner beam 330 and the outer beam 340, which may prolong the lifetime of the NCDS 200.

Figure 4:
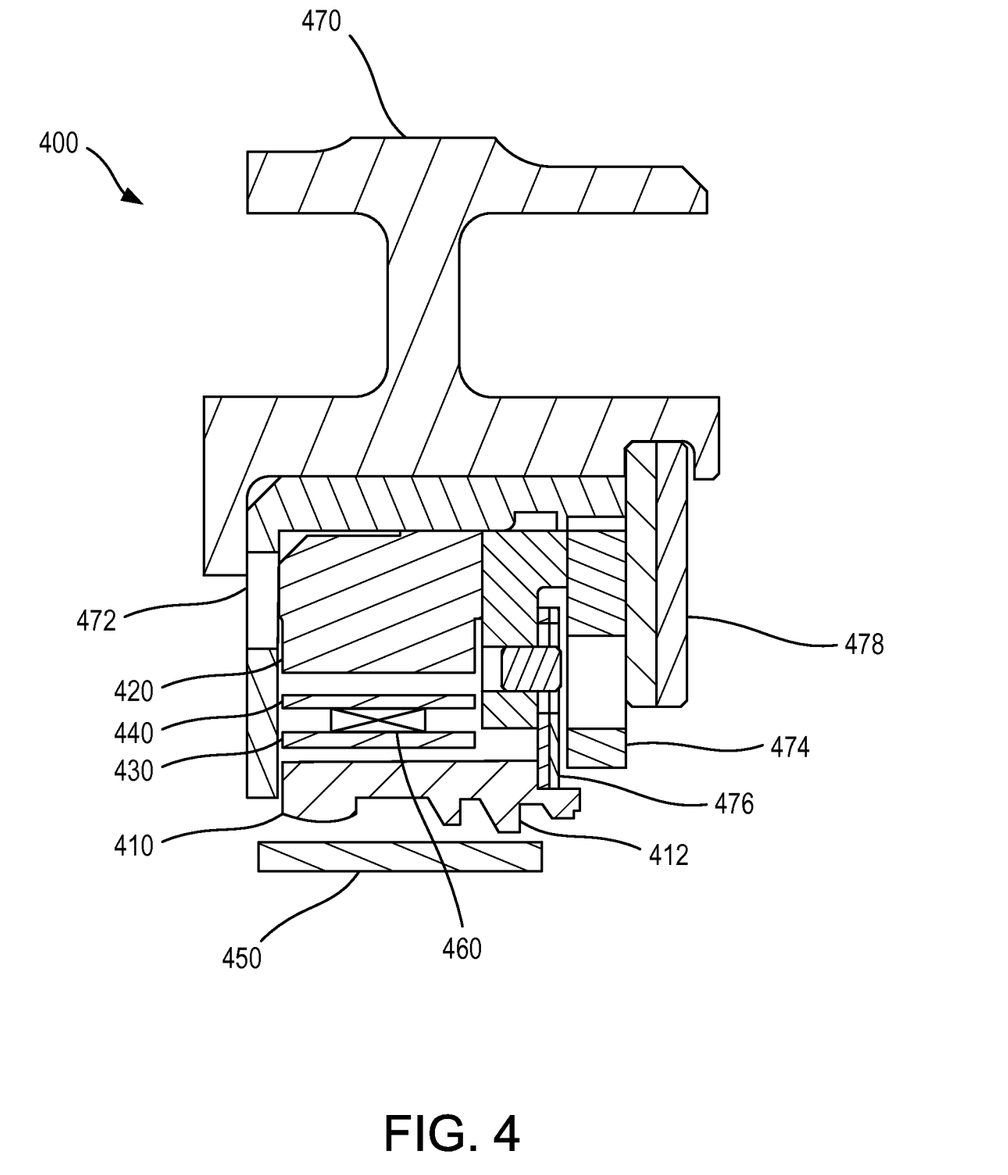
FIG. 4 illustrates a cross-section view in a circumferential direction of a non-contacting dynamic seal comprising a wave spring in accordance with various embodiments.

Referring to FIG. 4, a cross-section view of an NCDS 400 in the circumferential direction is illustrated according to various embodiments. The NCDS 400 may comprise a shoe 410, a full hoop outer ring 420, an inner beam 430, and an outer beam 440. The shoe 410 may be separated from a rotating component 450 by a thin layer of air. The particular design of the shoe 410, such as knife edges 412, may assist in creating the thin layer of air and maintaining separation from rotating component 450.

NCDS 400 is shown located within a static seal support 470. An L-support 472 and a retention mechanism 474 may hold the NCDS 400 between the L-support 472 and one or more seal plates 476. A split lock ring 478 may hold the assembly within the static seal support 470.

A wave spring 460 may be located between the inner beam 430 and the outer beam 440. The wave spring 460 may damp vibrations in the inner beam 430 and the outer beam 440. In various embodiments, the wave spring 460 may be located between the outer beam 440 and the full hoop outer ring 420, or between the inner beam 430 and the shoe 410.

Figure 5:
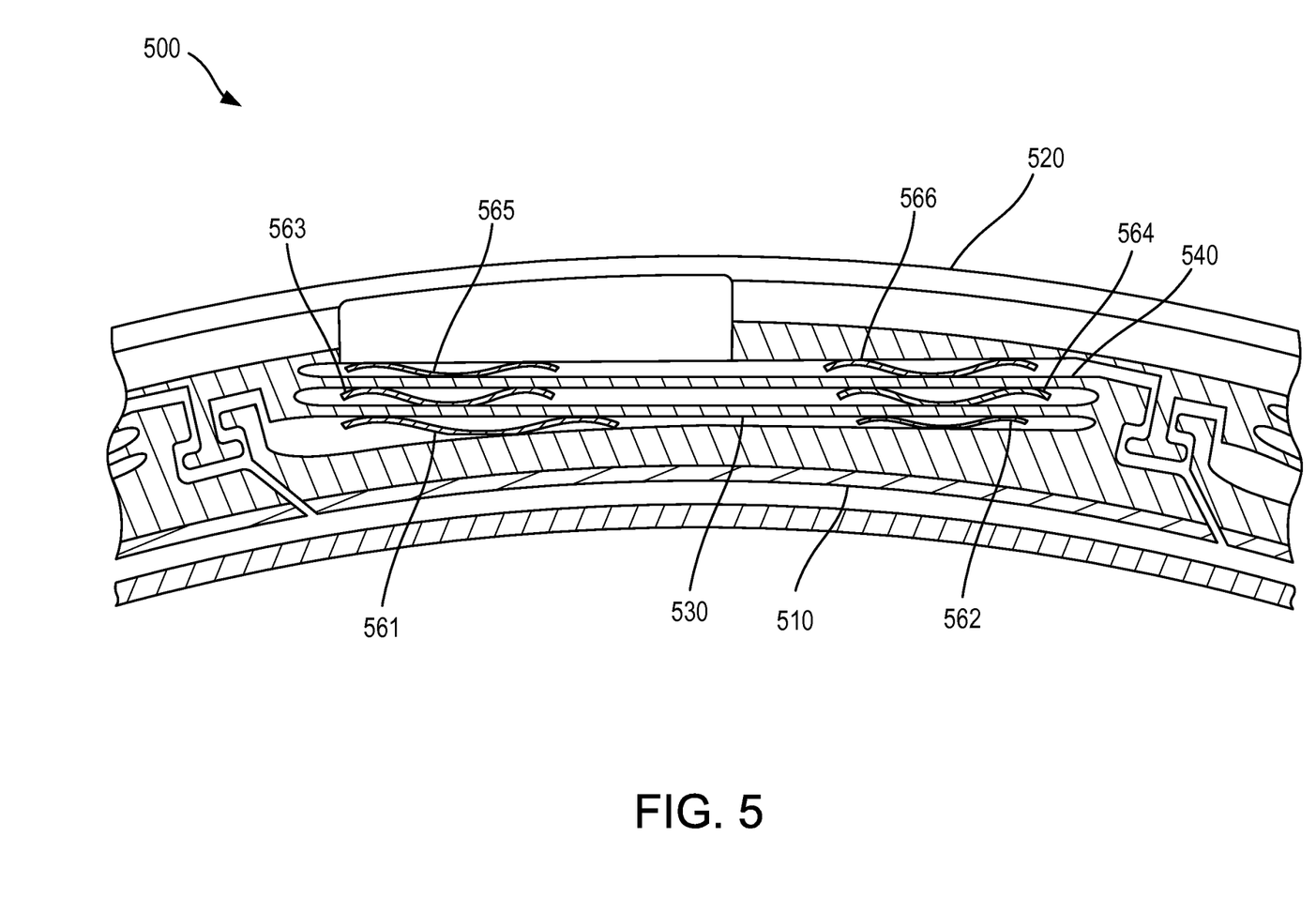
FIG. 5 illustrates a cross-section view in an axial direction of a non-contacting dynamic seal comprising a plurality of wave springs in accordance with various embodiments.

Referring to FIG. 5, a cross-section view of an inner segment 500 having multiple wave springs is illustrated according to various embodiments. Inner segment 500 may comprise a first wave spring 561 and a second wave spring 562 located between the shoe 510 and the inner beam 530, a third wave spring 563 and a fourth wave spring 564 located between the inner beam 530 and the outer beam 540, and a fifth wave spring 565 and a sixth wave spring 566 located between the outer beam 540 and the full hoop outer ring 520. One skilled in the art will recognize that any number of wave springs may be utilized in inner segment 500.

Figure 6:
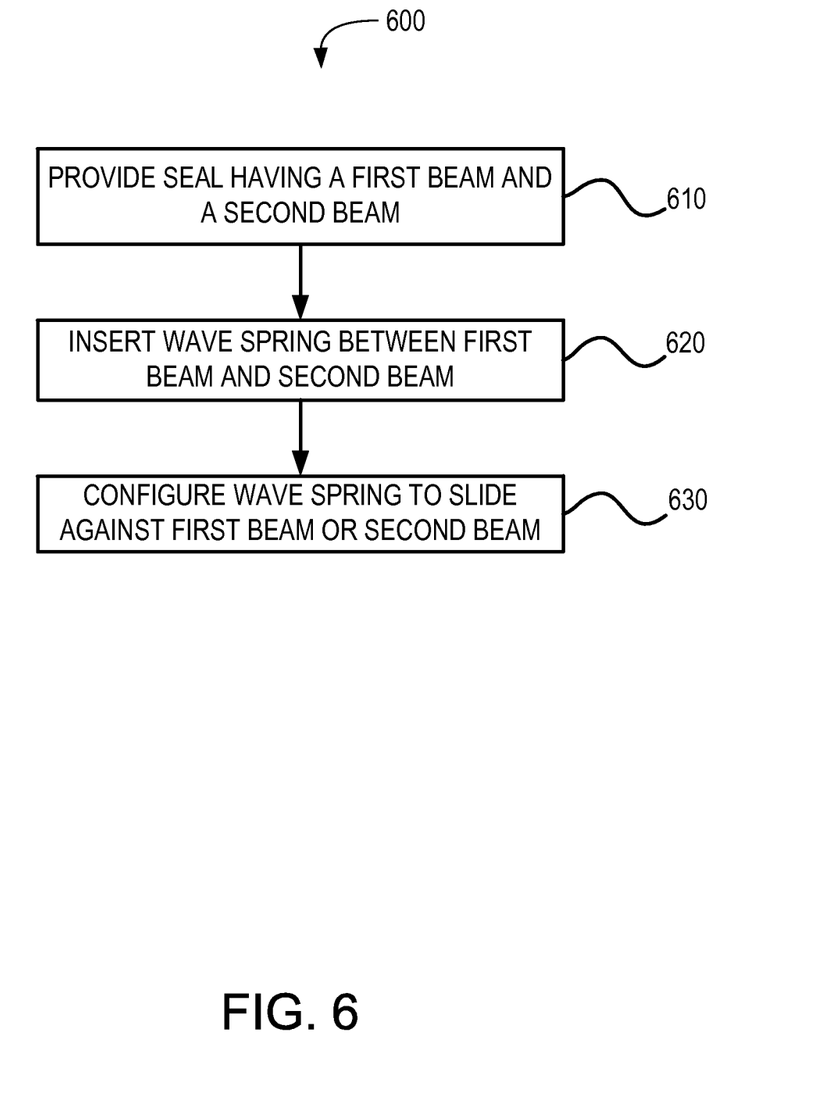
FIG. 6 illustrates a process for damping vibrations in a seal.

Referring to FIG. 6, a flowchart 600 of a process for damping vibrations in a seal is illustrated according to various embodiments. A seal may be provided (step 610). The seal may comprise a first beam and a second beam. In various embodiments, the seal may be a non-contacting dynamic seal. A wave spring may be inserted between the first beam and the second beam (step 620). In various embodiments, one or more springs may be inserted between the first beam and the second beam, between the first beam and a full hoop outer ring, and/or between the second beam and a shoe of the seal. The wave spring may be configured to slide against at least one of the first beam and the second beam (step 630). The sliding may damp vibrations in the seal.

Although described herein primarily with reference to non-contacting dynamic seals, wave springs may be utilized to damp vibrations in various different seals, such as brush seals or carbon seals. The wave spring may generally transfer displacement of a seal component into spring motion and friction.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A seal assembly for a gas turbine engine comprising:
    an outer ring;
    a shoe coupled to the outer ring, wherein the shoe is configured to move radially with respect to the outer ring and move radially with respect to a rotating component radially inward of the shoe;
    a first beam and a second beam coupling the shoe to the outer ring, the first beam positioned radially inward of the second beam;
    a first gap between a radially inner portion of the shoe and the first beam, a second gap between the first beam and the second beam, and a third gap between the second beam and radially outer portion of the shoe;
    a first wave spring located in the second gap, wherein the first wave spring comprises a first antinode and a second antinode in contact with the first beam, and a third antinode in contact with the second beam and is configured to damp vibrations in the first beam and the second beam, wherein the seal assembly is a non-contacting dynamic seal;
    a second wave spring between the first beam and the second beam; and
    a third wave spring between the first beam and at least one of the shoe or the outer ring.

2. The seal assembly of claim 1, wherein the first antinode and the second antinode are configured to slide against the first beam in response to a vibration in the first beam.

3. The seal assembly of claim 1, wherein the first wave spring comprises at least one of cobalt alloy and nickel alloy.

* * * * *